O'BRYAN & KREPS.
Plow.
No. 3,077.
Reissued Aug. 11, 1868.
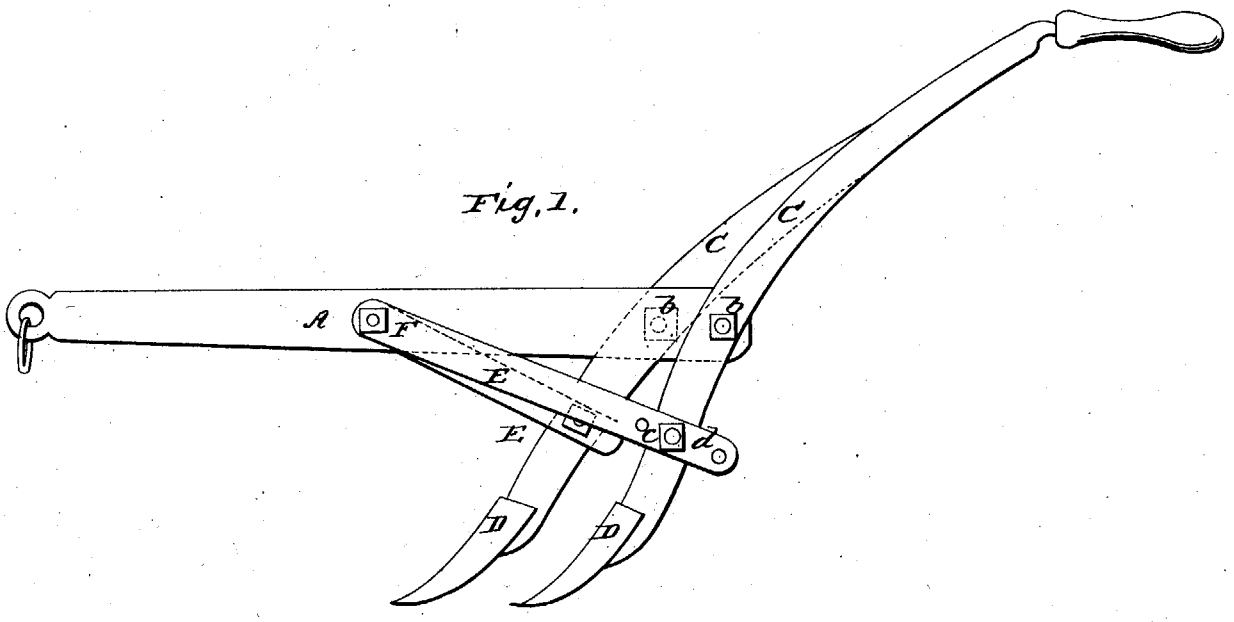
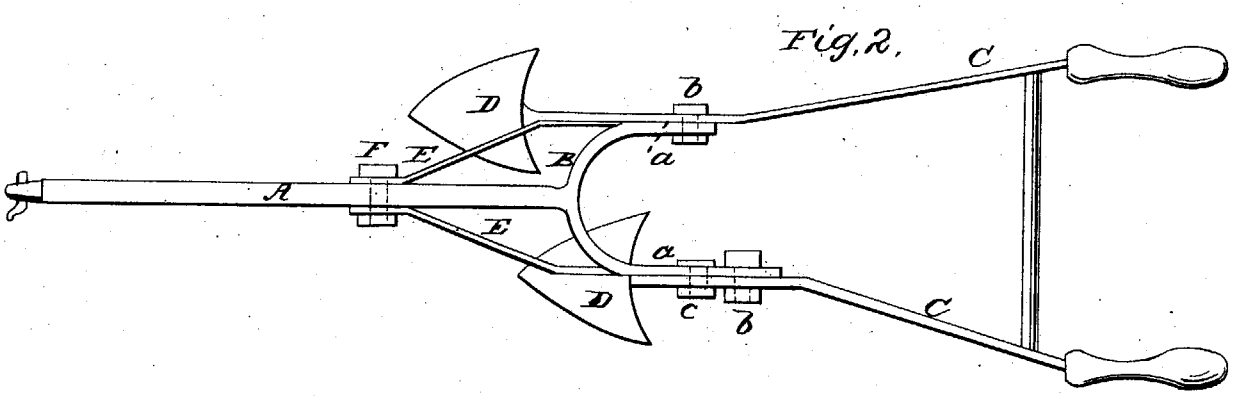
N. PETERS, Photo-Lithographer, Washington, D. C.

UNITED STATES PATENT OFFICE.

NIXON & CO., OF ALLIANCE, ASSIGNEES OF CHARLES O'BRYAN AND HENRY KREPS, OF MINERVA, OHIO.

IMPROVEMENT IN PLOWS.

Specification forming part of Letters Patent No. 33,096, dated August 20, 1861; Reissue No. 3,077, dated August 11, 1868.

*To all whom it may concern:*

Be it known that CHARLES O'BRYAN and HENRY KREPS, both of Minerva, in the county of Stark and State of Ohio, did invent a new and Improved Plow; and we do hereby declare that the following is a full and complete description of the same, reference being had to the accompanying drawings, making part of this specification, in which—

Figure 1 is a side elevation of the invention. Fig. 2 is a plan or top view of the same.

Like letters refer to like parts in the different views presented.

This invention relates to an improvement in that class of plows which is used for the cultivation of growing crops, and are commonly termed "shovel-plows."

The object of the within-described invention is to obtain a double plow of the kind specified, which will admit of having its shares readily adjusted to plow at a greater or less depth, and at the same time be simple, strong, and durable.

To enable those skilled in the art to fully understand and construct the invention, we will proceed to describe it.

A, Fig. 1, represents the beam of the plow, which is of wrought-iron, and has a bow or yoke, B, at its inner end, one arm, *a*, of the bow being longer than the other, *a'*, as shown clearly in Fig. 2.

C C represent the handles of the plow, which are also of wrought-iron, and are connected to the ends of the arms *a a'* of the yoke B by means of pivots or bolts *b*. The handles C C extend down below the beam A, and their lower parts form feet or standards for the shares D D, the handles C C being so curved as to serve both purposes, as shown clearly in Fig. 1. The lower part of one handle—the right or left hand one—is in advance of the other, and the lower part of each handle is braced by a bar, E. The front ends of the bars E E are connected to the beam A by a screw-bolt, F, and the back ends of said bars are connected to the handles C C by bolts *c*, said bolts passing through any of a series of holes, *d*, made in the bars E E.

The yoke B is of such a width that the shares D D will be a proper distance apart, and it will be seen that by adjusting the handles C C—that is to say, by giving them a greater or less inclination—the shares D D may be made to penetrate the ground more or less deeply, as circumstances may require, the adjustment or inclination of the handles being effected by adjusting the bolts *c* in the proper holes *d*.

The bars E E and yoke B render the beam A very stiff and firm, and admit of its being made of very moderate dimensions, with a requisite degree of strength.

There are but few parts, it will be seen, in the whole device, and it may be cheaply constructed and still be durable and efficient.

What is claimed as the improvement of the said HENRY KREPS and CHARLES O'BRYAN, and desired to be secured by Letters Patent, is—

1. The combination of the beam A, provided with the yoke B, and handles C C, with shares D attached, and the braces E E, arranged as and for the purpose set forth.

2. Making the handles C and standards in one piece, and so pivoting or connecting the same to the yoke or bow B of the beam as to be rendered adjustable, substantially as and for the purpose set forth.

3. The combination of the beam A and bow B, of one entire piece, and so arranged that one of the arms of said bow is longer than the other, and so attached to the handles or standards as to admit one of the shovels to be in advance of the other, substantially as and for the purpose described.

NIXON & CO.
By W. A. NIXON,
*Treasurer.*

Witnesses:
JOSEPH BARNABY,
LEWIS EVERHARD.